(12) United States Patent
Ito et al.

(10) Patent No.: US 7,384,441 B2
(45) Date of Patent: Jun. 10, 2008

(54) HONEYCOMB FILTER

(75) Inventors: Tadato Ito, Nagoya (JP); Shigeharu Hashimoto, Okazaki (JP)

(73) Assignee: NGK Insulators, Ltd., Nagoya (JP)

( * ) Notice: Subject to any disclaimer, the term of this patent is extended or adjusted under 35 U.S.C. 154(b) by 471 days.

(21) Appl. No.: 10/505,117

(22) PCT Filed: Mar. 19, 2003

(86) PCT No.: PCT/JP03/03323

§ 371 (c)(1),
(2), (4) Date: Feb. 16, 2005

(87) PCT Pub. No.: WO03/078027

PCT Pub. Date: Sep. 25, 2003

(65) Prior Publication Data

US 2005/0126140 A1    Jun. 16, 2005

(30) Foreign Application Priority Data

Mar. 19, 2002    (JP) .............................. 2002-075922

(51) Int. Cl.
*B01D 46/00*    (2006.01)
*F01N 3/023*    (2006.01)

(52) U.S. Cl. ...................... 55/523; 55/282.2; 55/385.3; 55/482; 55/484; 55/523; 55/DIG. 10; 55/DIG. 30; 60/311; 428/116

(58) Field of Classification Search ............... 55/282.2, 55/282.3, 385.3, 523, 524, DIG. 10, DIG. 30, 55/482, 484; 60/297, 300, 303, 311; 428/116, 428/117, 118
See application file for complete search history.

(56) References Cited

U.S. PATENT DOCUMENTS 3,853,485 A * 12/1974 Hogan ........................ 502/300

(Continued)

FOREIGN PATENT DOCUMENTS

EP          1 142 619 A1    10/2001

(Continued)

OTHER PUBLICATIONS

Suresh T. Gulati; "Strength and Thermal Shock Resistance of Segmented Wall-Flow Diesel Filters"; SAE Technical Paper Series 860008; pp. 11-18; Feb. 24-28, 1986.

*Primary Examiner*—Jason M. Greene
(74) *Attorney, Agent, or Firm*—Oliff & Berridge, PLC

(57) ABSTRACT

There is provided a honeycomb filter obtained by bonding, into one piece, a plurality of honeycomb segments comprising partition walls having filtering function, and a number of through-holes divided from each other by the partition walls and extending in an axial direction. Predetermined through-holes are plugged at one end face of the filter, and the remaining through-holes are plugged at the other end face of the filter. The honeycomb filter is characterized in that the honeycomb segment disposed in a peripheral portion of the honeycomb filter has a lower average bulk density than that of the honeycomb segment disposed in a central portion.

11 Claims, 6 Drawing Sheets

U.S. PATENT DOCUMENTS

| | | | |
|---|---|---|---|
| 4,335,783 A | 6/1982 | McBrayer et al. | |
| 4,810,554 A * | 3/1989 | Hattori et al. | 55/523 |
| 5,171,335 A * | 12/1992 | Kojima et al. | 55/523 |
| 5,916,133 A * | 6/1999 | Buhrmaster et al. | 60/297 |
| 6,669,751 B1 * | 12/2003 | Ohno et al. | 55/523 |
| 6,736,870 B2 * | 5/2004 | Best et al. | 55/523 |
| 6,902,599 B2 * | 6/2005 | Bardon | 55/523 |
| 7,238,217 B2 * | 7/2007 | Cutler et al. | 55/523 |
| 7,244,284 B2 * | 7/2007 | Miwa et al. | 55/523 |
| 2004/0244344 A1 * | 12/2004 | Ichikawa | 55/523 |

FOREIGN PATENT DOCUMENTS

| | | |
|---|---|---|
| EP | 1 217 185 A2 | 6/2002 |
| GB | 2 342 055 A * | 4/2000 |
| JP | B2 61-51240 | 11/1986 |
| JP | U 1-95518 | 6/1989 |
| JP | U 2-139319 | 11/1990 |
| JP | B2 06-057623 | 8/1994 |
| JP | A 08-028246 | 1/1996 |
| JP | A 2002-292225 | 10/2002 |
| JP | 2002-326035 * | 11/2002 |
| JP | A 2003-117320 | 4/2003 |

* cited by examiner

X-AXIS DIRECTION

HONEYCOMB FILTER

TECHNICAL FIELD

The present invention relates to a honeycomb filter used in, for example, a filter for capturing fine particles present in exhaust gas emitted from an internal combustion engine, a boiler or the like, particularly to a honeycomb filter having high regeneration efficiency in regeneration of the honeycomb filter.

BACKGROUND ART

Honeycomb filters are in use in, for example, a filter for capturing fine particles present in exhaust gas emitted from an internal combustion engine, a boiler or the like, particularly, particulate matter in exhaust gas emitted from diesel engine.

The honeycomb filter used for such a purpose generally has, as shown in FIGS. 10(a) and 10(b), a structure having a large number of through-holes (3) extending in an X axis direction divided from each other by partition walls (2), and through-holes (3) are alternately plugged at each end face so that each end face looks checkerboard pattern. In such a honeycomb filter, a subject fluid flows in the through-holes (3) not plugged at inflow end face (42), that is, plugged at outflow end face (44), passes through the porous partition walls (2), and is discharged via the adjacent through-holes (3), that is, the through-holes (3) plugged at the inflow end face (42) and not plugged at outflow end face (44). In this case, the partition walls (2) act as a filter. For example, soot discharged from a diesel engine is captured by the partition walls and deposited on the partition walls. In the honeycomb filters used in such a condition, there was such a problem that the sharp temperature change of exhaust gas and the local heating made non-uniform the temperature distribution inside the honeycomb structure and caused cracks in a honeycomb filter. When the honeycomb filter is used particularly as a filter for capturing particulate matter in exhaust gas emitted from a diesel engine (this filter is hereinafter referred to as DPF), it is necessary to burn the carbon particles deposited on the filter to remove the particles and regenerate the filter and, in that case, there was such a problem that high temperatures were inevitably developed locally in the filter to deteriorate regeneration efficiency due to non-uniformity of regeneration temperature as well as to cause cracks due to large thermal stress. Further, non-uniform temperature distribution during regeneration made it difficult for the whole portion of the filter to have at an optimum temperature and also made it difficult to have high regeneration efficiency.

Hence, there have been proposed processes for producing a honeycomb filter by bonding a plurality of individual segments using an adhesive. In, for example, U.S. Pat. No. 4335783 is disclosed a process for producing a honeycomb structure, which comprises bonding a large number of honeycomb parts using a discontinuous adhesive. Also in JP-B-61-51240 is proposed a thermal shock resistant rotary regenerative heat exchanger which is formed by extrusion molding matrix segments of honeycomb structure made of a ceramic material; firing them; making smooth, by processing, the outer peripheral portion of the fired segment to form a bonding surface; coating the bonding surface with a ceramic adhesive which turns, after firing, to have substantially the same chemical composition as the matrix segment and a difference in thermal expansion coefficient of 0.1% or less at 800 degree C.; loading the required number of segments; and firing the coated segments. Also in the SAE paper 860008 of 1986 is disclosed a ceramic honeycomb structure obtained by bonding cordierite honeycomb segments with a cordierite cement. Further, in JP-A-8-28246, a ceramic honeycomb structure is disclosed in which a certain number of honeycomb ceramic members are bonded by an elastic seal material including at least a three-dimensionally crossing inorganic fiber, an inorganic binder, an organic binder, and inorganic particles. It was also tried to produce a honeycomb filter using, for example, a silicon carbide based material of high thermal conductivity and high heat resistance, in order to prevent it from localized high temperature to prevent breakage due to thermal stress.

By using segment and/or a highly heat-resistant material such as silicon carbide based material, the damage caused by thermal stress could be prevented to some extent. However, the temperature difference between the outer peripheral portion and center of honeycomb filter could not be eliminated, and improvement in regeneration efficiency by uniform regeneration was insufficient. Further, local heating appeared during regeneration, in some cases.

DISCLOSURE OF THE INVENTION

The present invention was made in view of the above situation and aims at providing a honeycomb filter superior in regeneration efficiency in regeneration of a honeycomb filter.

As a result of intensive studies on the above-described problem, it was found that in a peripheral part of a honeycomb filter, temperature was not sufficiently elevated by heat release from the peripheral part to outside. It was further found that this phenomenon was remarkable and regeneration efficiency at the peripheral part was deteriorated when the material having high thermal conductivity such as a silicon carbide based material was used for the honeycomb filter, and further found that the heat release can be inhibited by reducing bulk density of the peripheral part, consequently regeneration efficiency can be improved.

According to the present invention, based on the above-described findings, there is provided a honeycomb filter comprising a plurality of honeycomb segments bonded into one piece, each of the honeycomb segments comprising partition walls having filtering function, and a number of through-holes divided from each other by the partition walls and extending in an axial direction, predetermined through-holes being plugged at one end face of the filter, and the remaining through-holes being plugged at the other end face of the filter, wherein the honeycomb segment disposed in a peripheral portion of the honeycomb filter has a lower average bulk density than that of the honeycomb segment disposed in a central portion.

In the present invention, it is preferred that the honeycomb segment disposed in the peripheral portion has a lower average cell density than that of the honeycomb segment disposed in the central portion. It is also preferred that the honeycomb segment disposed in the peripheral portion has a lower average partition wall thickness than that of the honeycomb segment disposed in the central portion. Further, it is preferred that the honeycomb filter has a thermal conductivity of 10 to 60 W/mK. It is also preferred that the honeycomb filter comprises silicon carbide or a silicon/silicon carbide based composite material. Further, it is preferred that 70% by volume or more of the honeycomb filter is constituted by the honeycomb segment having a sectional area of 900 to 10,000 $mm^2$ in a section perpendicular to the axial direction.

BRIEF DESCRIPTION OF THE DRAWINGS

FIG. 1(a) is a schematic perspective view, FIG. 1(b) is schematic plan view and FIG. 1(c) is a schematic sectional view.

FIG. 9(a) is a schematic plan view, and FIG. 9(b) is a schematic perspective view.

FIG. 10(a) is a schematic perspective view, and FIG. 10(b) is a schematic partially enlarged view.

BEST MODE FOR CARRYING OUT THE INVENTION

Figure 1A:
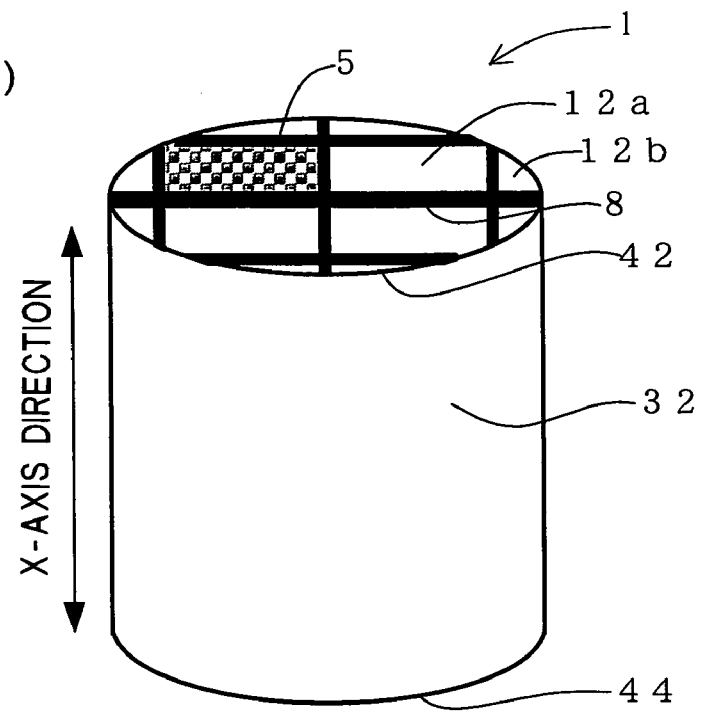
FIGS. 1(a) to 1(c) are schematic views showing one embodiment of a honeycomb filter of the present invention.

A honeycomb filter and a process for production thereof according to the present invention are described in detail below with reference to the accompanying drawings. However, the present invention is not restricted to the following embodiments. In the followings, "section" means a section perpendicular to the direction of through-holes (X-axis direction), unless otherwise specified. In the drawings, each reference numeral means as follows: 1 honeycomb filter; 2 partition wall; 3 through-hole; 5 plugging material; 8 bonding material; 10 sectional center of honeycomb filter; 12a honeycomb segment disposed in the central portion; 12b honeycomb segment disposed in the peripheral portion; 32 outermost wall of honeycomb filter; 42 and 44 end face.

Figure 1B:
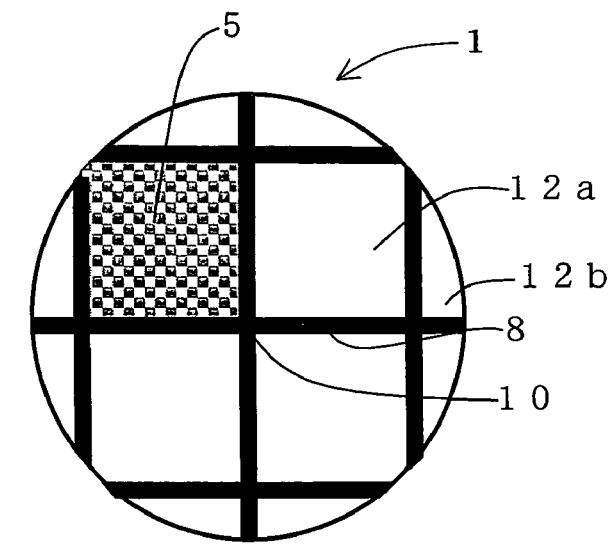
Figure 1C:
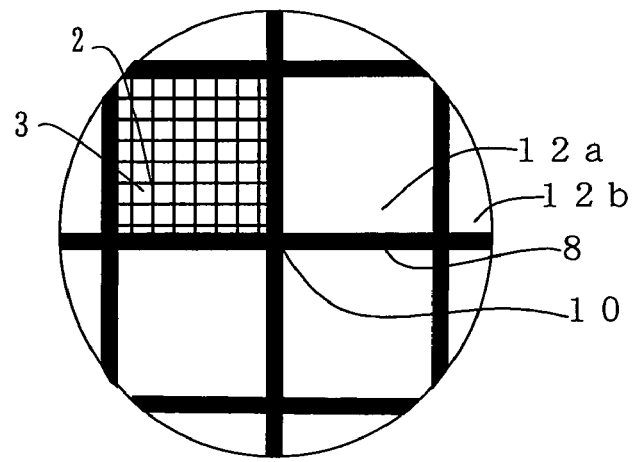

FIGS. 1(a) to 1(c) are schematic views showing one embodiment of a honeycomb filter of the present invention, FIG. 1(a) is a schematic perspective view, FIG. 1(b) is schematic plan view, and FIG. 1(c) is a schematic sectional view. The honeycomb filter (1) shown in FIGS. 1(a), 1(b) and 1(c) is formed by bonding honeycomb segments (12a) and (12b) which have partition walls (2) having filtering function and through-holes (3). The through-holes (3) are divided from each other by the partition walls (2) and extending in the X-axis direction. At the end faces (42) and (44) to which the through-holes are extending, predetermined through-holes (3) are plugged by a plugging material (5) at one end, and the remaining through-holes are plugged by the plugging material (5) at the other end. In FIGS. 1(a) to 1(c) and following drawings, the partition wall (2), the through-hole (3), and plugging material (5) are shown in the limited honeycomb segments. However, they exist in all honeycomb segments, needless to say.

An important feature of the present invention is that taking the honeycomb filter shown in FIGS. 1(a) to 1(c) as an example, an average bulk density of the honeycomb segments (12b) disposed in a peripheral portion of the honeycomb filter (1) is lower than that of the honeycomb segments (12a) disposed in a central portion of the honeycomb filter (1). With this constitution, heat release at the peripheral portion can be inhibited. Particularly when the honeycomb filter is used as a DPF, heat release at a regeneration time of the DPF can be inhibited, and regeneration efficiency of the DPF can be improved. By improving regeneration efficiency in such a manner, it can be expected to inhibit soot buildup in a DPF and to inhibit soot from burning out of control.

In the present invention, "the honeycomb segment disposed in the central portion" means that a honeycomb segment including or adjacent to a sectional center (10) of a honeycomb filter, or a honeycomb segment of which every side wall comes into contact with other honeycomb segments (that is a honeycomb segment not constituting an outermost wall of a honeycomb filter). The "honeycomb segment disposed in the peripheral portion" means that a honeycomb segment not including a sectional center (10) and constituting a part of an outermost wall (32) of a honeycomb filter. Bulk density means mass per unit volume of a honeycomb segment including through-holes which is vacancy.

The honeycomb segment(s) disposed in the central portion may satisfy the condition for an average bulk density described above as a whole. Therefore, as described later in the description in reference to FIG. 3, two or more kinds of groups of honeycomb segments having different filter characteristics may be disposed in the central portion in combination with several segments selected from each group.

The present invention is characterized in that an average bulk density of the whole honeycomb segment(s) disposed in the peripheral portion is lower than that of the whole honeycomb segment(s) disposed in the central portion. In the present invention, when a ratio of the average bulk density of the whole honeycomb segment(s) disposed in the peripheral portion to the average bulk density of the whole honeycomb segment(s) disposed in the central portion is too close to 1, effect of the present invention is difficult to be obtained; when the ratio is too low, strength of the honeycomb segment disposed in the peripheral portion is not enough. A preferable range of the ratio of the average bulk density of the whole honeycomb segment(s) disposed in the peripheral portion to the average bulk density of the whole honeycomb segment(s) disposed in the central portion is 0.5 to 0.95, more preferably 0.55 to 0.90, most preferably 0.60 to 0.85.

In the honeycomb filter shown in FIGS. 1(a) and 1(b), four honeycomb segments (12a) adjacent to the sectional center (10) of the honeycomb filter are the honeycomb segments disposed in the central portion, eight honeycomb segments (12b) disposed around the four honeycomb segments (12a) are the honeycomb segments disposed in the peripheral portion. In the case of FIGS. 1(a) and 1(b), a cell density, that is the number of through-holes (cells) per unit sectional area, of the honeycomb segments (12a) disposed in the central portion is 31 cells/cm$^2$ (200 cells/in.$^2$); and a cell density of the honeycomb segments (12b) disposed in the peripheral portion is 15.5 cells/cm$^2$ (100 cells/in.$^2$). An average partition wall thickness in every honeycomb segment is about 380 μm (15 mil). By having the average cell density of the honeycomb segment(s) disposed in the peripheral portion lower than that of the honeycomb segment(s) disposed in the central portion, it is possible to obtain the average bulk density of the honeycomb segment(s) disposed in the peripheral portion lower than that of the honeycomb segment(s) disposed in the central portion. In the honeycomb filter shown in FIGS. 1(*a*) and 1(*b*), when a porosity of the honeycomb segments is 45%, an average bulk density of the four honeycomb segments (12*a*) disposed in the central portion is 0.63 g/cm³, and an average bulk density of the eight honeycomb segments (12*b*) disposed in the peripheral portion is 0.46 g/cm³.

In the present invention, there is no particular restriction as to the cell density. However, too small a cell density results in a filter of insufficient strength and insufficient effective geometrical surface area (may be referred to as GSA) in a filter; too large a cell density results in a large pressure loss when a subject fluid passes. The cell density is preferably 6 to 2,000 cells/in.² (0.9 to 311 cells/cm²), more preferably 50 to 1,000 cells/in.² (7.8 to 155 cells/cm²), most preferably 100 to 400 cells/in.² (15.5 to 62.0 cells/cm²). It is preferable that the cell density of the honeycomb segment(s) disposed in the central portion is made higher than that of the honeycomb segment(s) disposed in the peripheral portion in such a range. Thus, each bulk density of the peripheral portion and the central portion can be made to a desired value. Also, there is no particular restriction as to a sectional shape (cell shape) of through-holes (3). However, the sectional shape is preferably any of a triangle, a tetragon, a hexagon and a corrugated shape form the standpoint of production of a honeycomb segment.

Figure 2:
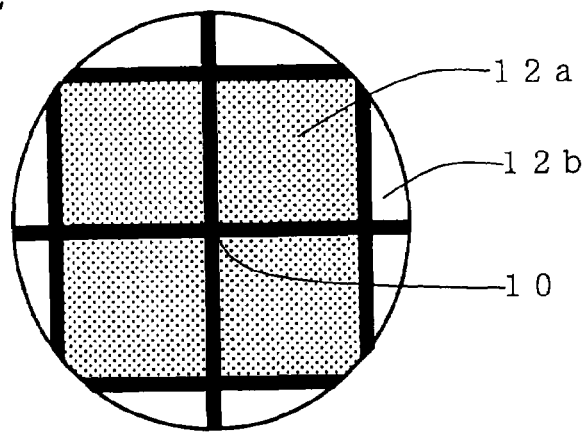
FIG. 2 is a schematic plan view showing another embodiment of a honeycomb filter of the present invention.

FIG. 2 shows another embodiment of a honeycomb filter according to the present invention. In the case of FIG. 2, a partition wall thickness of the honeycomb segments (12*a*) disposed in the central portion is about 380 μm (15 mil), and a partition wall thickness of the honeycomb segments (12*b*) disposed in the peripheral portion is about 300 μm (12mil). A cell density of each honeycomb segment is about 31 cells/cm² (200 cells/in.²). By having the average partition wall thickness of the honeycomb segment(s) disposed in the peripheral portion lower than that of the honeycomb segment(s) disposed in the central portion, it is possible to obtain a bulk density of the honeycomb segment(s) disposed in the peripheral portion lower than that of the honeycomb segment(s) disposed in the central portion. In the honeycomb filter shown in FIG. 2, when a porosity of the honeycomb segments is 45%, an average bulk density of the four honeycomb segments (12*a*) disposed in the central portion is 0.63 g/cm³, and an average bulk density of the eight honeycomb segments (12*b*) disposed in the peripheral portion is 0.51 g/cm³.

In the present invention, a partition wall (2) of a honeycomb filter (1) is preferably of a porous material serving as a filter. There is no particular restriction as to thickness of a partition wall (2). However, too large a thickness gives too large a pressure loss when a subject fluid passes through the partition wall; too small a thickness results in an insufficient filter strength; therefore, such thicknesses are not preferred. Any partition wall thickness of the honeycomb segment(s) disposed in the peripheral portion, the central portion and the other portion is preferably 30 to 2000 μm, more preferably 40 to 1000 μm, most preferably 50 to 500 μm. It is preferable that a partition wall thickness of the honeycomb segment(s) disposed in the central portion is made higher than that of the honeycomb segment(s) disposed in the peripheral portion in such a range. Thus, each bulk density of the peripheral portion and the central portion can be made to a desired value.

Figure 3:
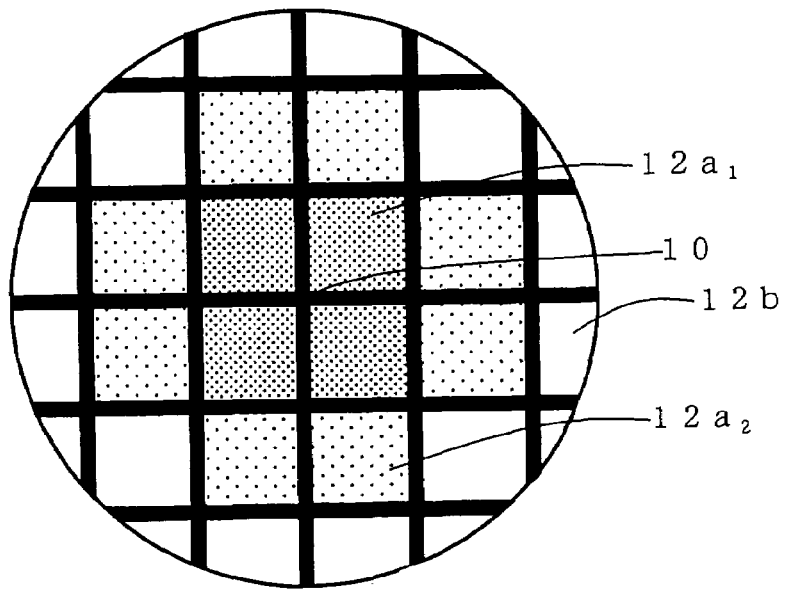
FIG. 3 is a schematic plan view showing still another embodiment of a honeycomb filter of the present invention.

FIG. 3 is a schematic plan view showing still another embodiment of the present invention. In FIG. 3, honeycomb segments disposed in the central portion are four honeycomb segments (12*a*₁) adjacent to the sectional center (10) of a honeycomb filter and eight honeycomb segments (12*a*₂) disposed around the four honeycomb segments (12*a*₁) and not constituting the outermost wall of a honeycomb filter. Honeycomb segments disposed in the peripheral portion are twenty honeycomb segment s(12*b*) constituting the outermost wall of a honeycomb filter. In the honeycomb filter shown in FIG. 3, an average partition wall thickness and a cell density of the total twelve honeycomb segments (12*a*) disposed in the central portion are about 350 μm (14 mil) and about 47 cells/cm² (300 cells/in.²) respectively; an average partition wall thickness and a cell density of the total twenty honeycomb segments (12*b*) disposed in the peripheral portion are about 300 μm (12 mil) and about 31 cells/cm² (200 cells/in.²) respectively. It is also preferable for reducing the bulk density of the honeycomb segment disposed in the peripheral portion that the honeycomb segment(s) disposed in the central portion is/are made to have higher cell density and higher partition wall thickness than those of the honeycomb segment(s) disposed in the peripheral portion as described above. In the case of FIG. 3, when a porosity of the honeycomb segments is 45%, an average bulk density of the twelve honeycomb segments (12*a*) disposed in the central portion is about 0.70 g/cm³, and an average bulk density of the twenty honeycomb segments (12*b*) disposed in the peripheral portion is about 0.51 g/cm³.

Figure 4:
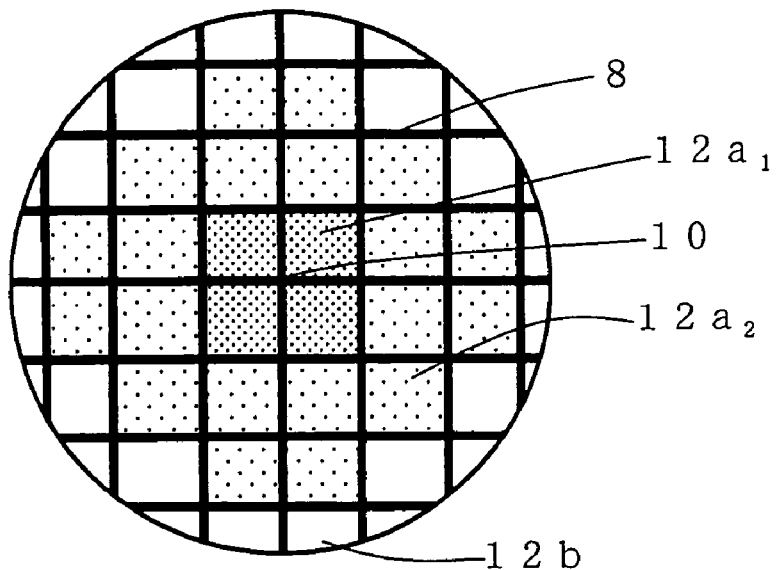
FIG. 4 is a schematic plan view showing still another embodiment of a honeycomb filter of the present invention.

FIG. 4 shows still another embodiment of a honeycomb filter of the present invention. In the honeycomb filter shown in FIG. 4, an average partition wall thickness and a cell density of four honeycomb segments (12a₁) disposed in the central portion are about 380 μm (15 mil) and about 47 cells/cm² (300 cells/in.²) respectively, an average partition wall thickness and a cell density of the other twenty honeycomb segments (12*a*₂) disposed in the central portion are about 330 μm (13 mil) and about 31 cells/cm² (200 cells/in.²) respectively; an average partition wall thickness and a cell density of total twenty-eight honeycomb segments (12*b*) disposed in the peripheral portion are about 280 μm (11 mil) and about 31 cells/cm² (200 cells/in.²) respectively. In the case of FIG. 4, when a porosity of the honeycomb segments is 45%, an average bulk density of the twenty-four honeycomb segments (12*a*) disposed in the central portion is about 0.58 g/cm³, and an average bulk density of the twenty-eight honeycomb segments (12*b*) disposed in the peripheral portion is about 0.47 g/cm³. In such a case, every honeycomb segment disposed in the central portion does not necessary have the same bulk density. Honeycomb segments having different bulk density may be combined. In such a case, as in the honeycomb filter shown in FIG. 4, it is preferable that the bulk density of the honeycomb segment(s) near to the sectional center is made higher, and the bulk density is made lower sequentially toward the peripheral portion. Similarly to the honeycomb segments disposed in the central portion, every honeycomb segment disposed in the peripheral portion does not necessary have the same bulk density. Honeycomb segments having different bulk density may be combined to constitute a honeycomb filter.

Figure 5:
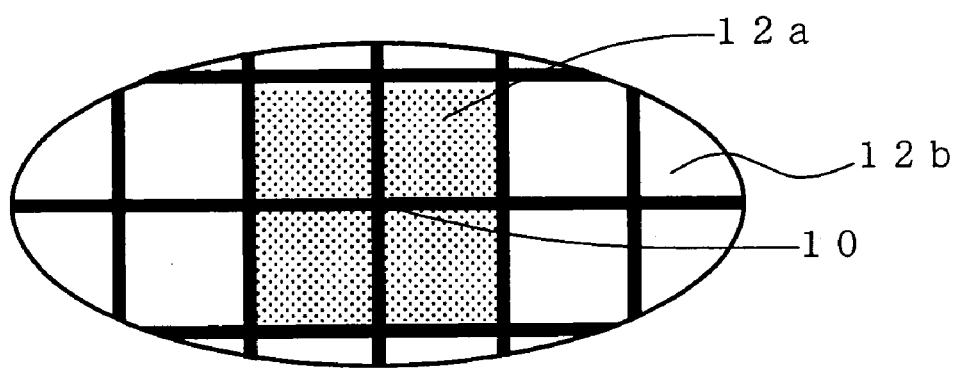
FIG. 5 is a schematic plan view showing still another embodiment of a honeycomb filter of the present invention.
Figure 6:
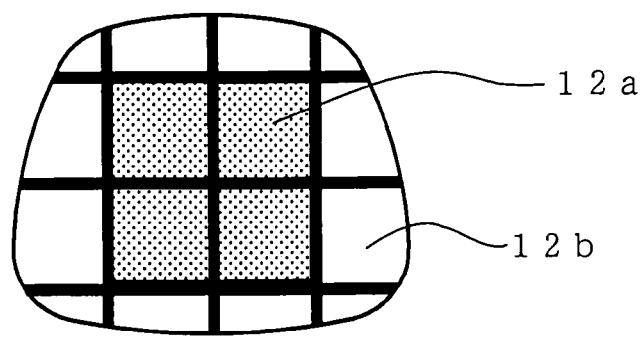
FIG. 6 is a schematic plan view showing still another embodiment of a honeycomb filter of the present invention.
Figure 7:
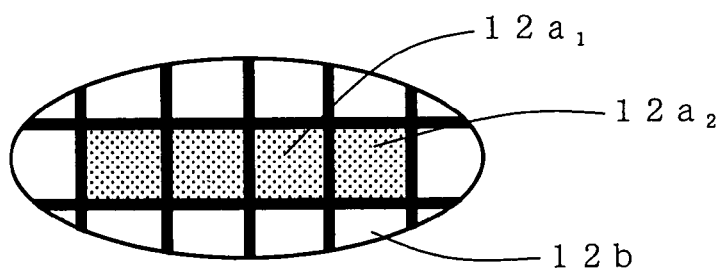
FIG. 7 is a schematic plan view showing still another embodiment of a honeycomb filter of the present invention.

Several embodiments of the honeycomb filter according to the present invention are shown in FIGS. 5 to 8. Partition wall thicknesses, cell densities and bulk densities of the honeycomb filters shown in FIGS. 1 to 8 are shown in Table 1. There is no particular restriction as to the sectional shape of a honeycomb filter of the present invention. The sectional shape may be a circle as shown in, for example, FIG. 1, an oval as shown in FIG. 5 or FIG. 7, an irregular shape as shown in FIG. 6, a race truck shape, an ellipse, or a polygon (e.g. a triangle, a substantial triangle, a tetragon or a substantial tetragon).

TABLE 1

Figure 8:
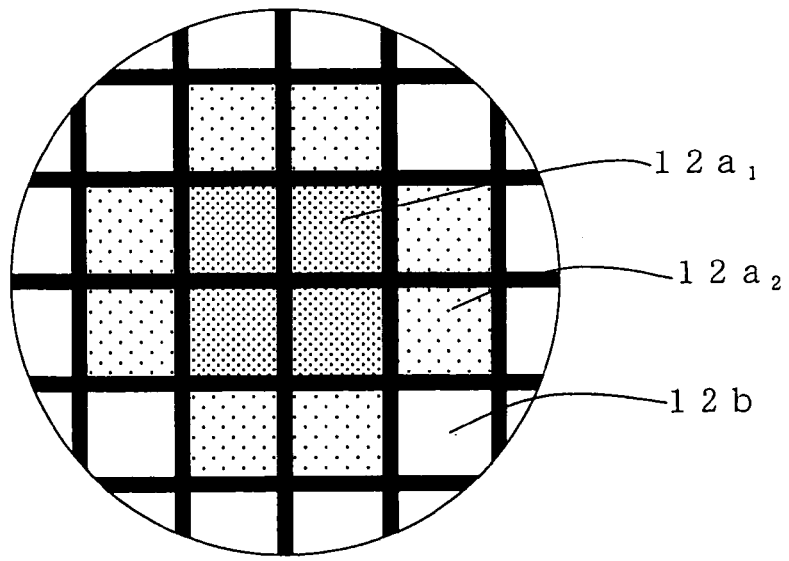
FIG. 8 is a schematic plan view showing still another embodiment of a honeycomb filter of the present invention.
Figure 9A:
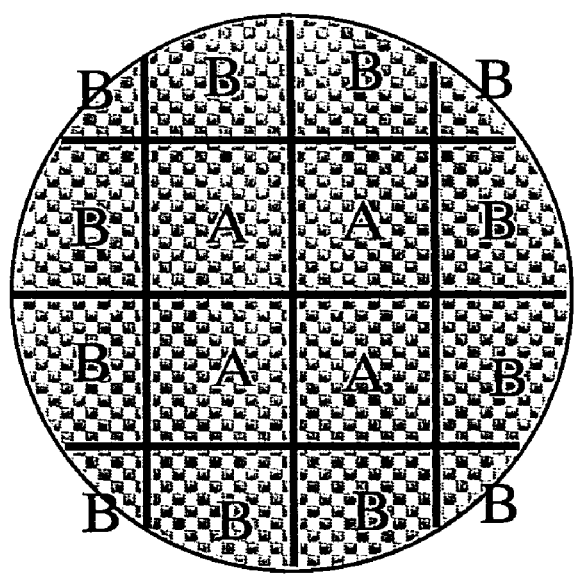
FIGS. 9(a) and 9(b) are schematic views showing a honeycomb filter produced in Examples.
Figure 9B:
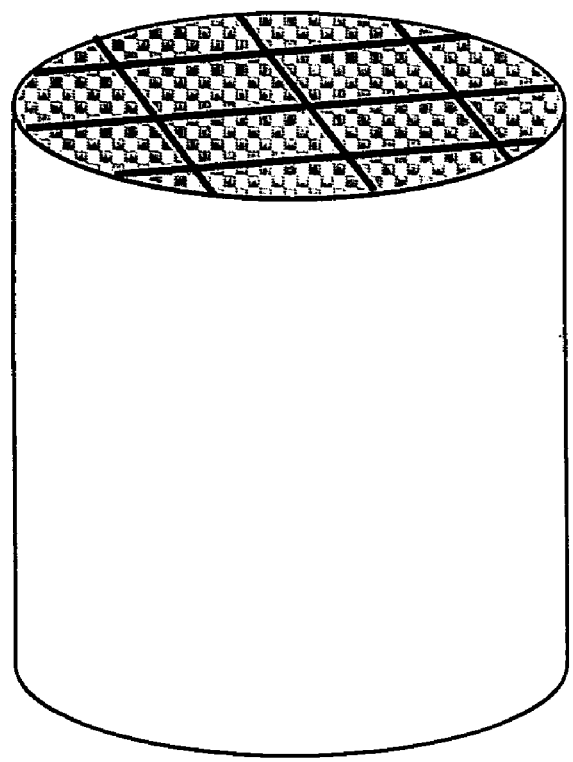
Figure 10A:
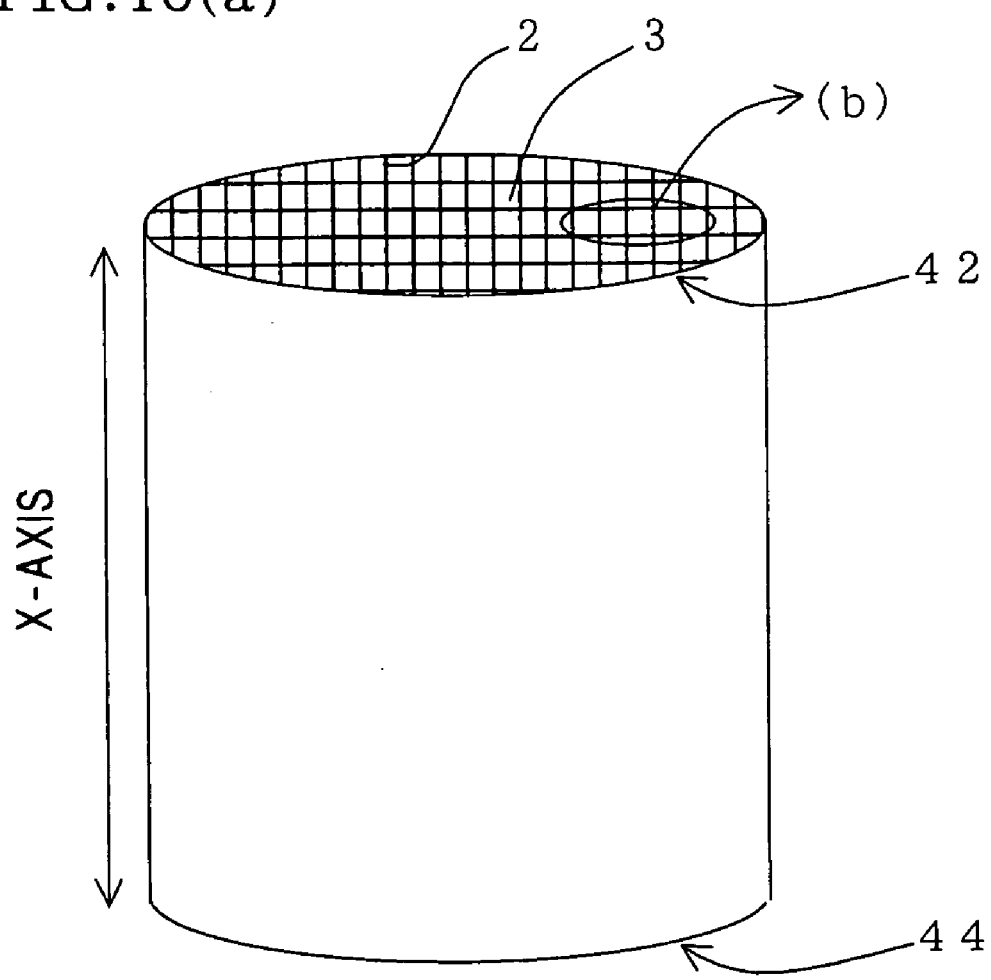
FIGS. 10(a) and 10(b) are schematic views showing a conventional honeycomb filter.
Figure 10B:
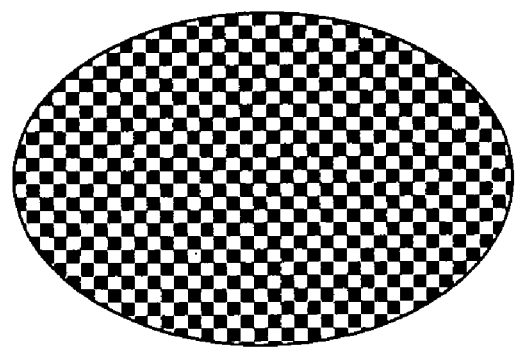

| FIG. No. | Honeycomb segment disposed in the central portion | | | | | Honeycomb segment disposed in the peripheral portion | | |
|---|---|---|---|---|---|---|---|---|
| | 12a$_1$ | | 12a$_2$ | | | 12b | | |
| | partition wall thickness (μm) | cell density (cells/cm$^2$) | partition wall thickness (μm) | cell density (cells/cm$^2$) | average bulk density (g/cm$^3$) | partition wall thickness (μm) | cell density (cells/cm$^2$) | average bulk density (g/cm$^3$) |
| FIG. 1 | 380 | 31 | — | — | 0.63 | 380 | 15.5 | 0.46 |
| FIG. 2 | 380 | 31 | — | — | 0.63 | 300 | 31 | 0.51 |
| FIG. 3 | 350 | 47 | 350 | 47 | 0.70 | 300 | 31 | 0.51 |
| FIG. 4 | 380 | 47 | 330 | 31 | 0.58 | 280 | 31 | 0.47 |
| FIG. 5 | 380 | 47 | — | — | 0.75 | 380 | 31 | 0.69 |
| FIG. 6 | 380 | 31 | — | — | 0.63 | 300 | 31 | 0.51 |
| FIG. 7 | 380 | 31 | — | — | 0.63 | 300 | 31 | 0.51 |
| FIG. 8 | 350 | 47 | 350 | 47 | 0.70 | 300 | 31 | 0.51 |

There is no particular restriction as to thermal conductivity of a honeycomb filter of the present invention. However, too high thermal conductivity results in too much heat release, so that temperature does not increase sufficiently during regeneration, and regeneration efficiency is deteriorated even in the honeycomb filter of the present invention, therefore, it is not preferred. On the other hand, too low a thermal conductivity raises such a problem that a local high temperature is developed in regeneration of a honeycomb filter by burning soot, as a result, cracks tends to occur due to large thermal stress. The thermal conductivity of the honeycomb filter is preferably 10 to 60 W/mK, more preferably 20 to 55 W/mK, most preferably 25 to 50 W/mK at 40 degree C.

In the present invention, from viewpoints of strength, heat resistance, and the like, a honeycomb filter preferably contains, as a main component, at least one material selected from the group consisting of cordierite, mullite, alumina, spinel, silicon carbide, a silicon carbide/cordierite based composite material, a silicon/silicon carbide based composite material, silicon nitride, lithium aluminum silicate, aluminum titanate, a Fe—Cr—Al based metal, and a combination of these. Silicon carbide or silicon/silicon carbide based composite material is especially suitable for the honeycomb filter of the present invention, because the material has a thermal conductivity in the range described above and has high heat resistance. Here, the term "main component" means that it constitutes 50% by mass or more, preferably 70% by mass or more, further preferably 80% by mass or more of the honeycomb filter. In the present invention, for the honeycomb filter (1) formed of metal silicon (Si) and silicon carbide (SiC), when an Si content defined by Si/(Si+SiC) is excessively small in the honeycomb filter (1), effect of Si addition cannot be obtained. When the content exceeds 50% by mass, characteristics of SiC as the effects such as heat resistance and high thermal conductivity cannot be obtained. The Si content is preferably 5 to 50% by mass, further preferably 10 to 40% by mass.

There is no particular restriction as to the size of a honeycomb segment constituting a honeycomb filter of the present invention. However, too large a segment size is not preferred because breakage occurs owing to thermal stress; too small a segment size is not preferred, either, because segment production and bonding of segments into one piece are complicated. A size of the segment is such that the sectional area of a section perpendicular to through-holes, that is the sectional area of a section perpendicular to X axis in FIG. 1, is preferably 900 to 10,000 mm$^2$, more preferably 950 to 5,000 mm$^2$, most preferably 1,000 to 3,500 mm$^2$, and it is preferred that 70% by volume or more of the honeycomb filter is constituted by honeycomb segments of this size. There is no particular restriction as to the shape of the honeycomb segment. The basic shape may be a tetragon in sectional shape, that is, a quadrangular prism as shown in FIGS. 1 to 8, and the shape of outer peripheral honeycomb segments may be appropriately selected so as to fit the shape of the finished honeycomb filter, as shown in FIGS. 1 to 8.

The honeycomb filter of the present invention is formed by bonding a plurality of honeycomb segments into one piece. In this case, the segments may be bonded into one piece using a bonding material (8). Preferable bonding materials can be selected from the materials preferably usable as the main component of the honeycomb filter described above. When a difference in thermal expansion coefficient between the bonding material (8) and honeycomb segment (12) is excessively large, the thermal stress is undesirably concentrated on the bonded portion at a heating/cooling time. The difference in thermal expansion coefficient between the bonding material and the honeycomb segment at 20 degree C. to 800 degree C. is preferably $1 \times 10^{-6}$/degree C. or less.

In the honeycomb filter of the present invention, predetermined through-holes are plugged at one end, and remaining through-holes are plugged at the other end. As a material used for plugging, ceramics or metals preferably usable for the honeycomb filter mentioned above may be preferably applied.

It is preferred that the honeycomb filter of the present invention is loaded with a catalyst, for example, a metal having a catalytic activity when the present honeycomb filter is intended to be used as a catalyst carrier for purification of exhaust gas emitted from a heat engine such as an internal combustion engine or from a burner such as a boiler, or for reforming of liquid fuel or gaseous fuel. As a representative metal having a catalytic activity, Pt, Pd, Rh are mentioned, and it is preferred to load at least one of them on the honeycomb filter.

Next, a process for producing a honeycomb filter of the present invention will be described.

As a raw material powder for a honeycomb filter, the above-described preferable materials such as a silicon carbide powder are used. To the powder, binders such as methyl cellulose and hydroxypropoxyl methylcellulose are added. Further, a surface-active agent and water are added to prepare clay having plasticity. This clay is subjected to extrusion to obtain an extrudate having a predetermined partition wall thickness and a cell density.

The extrudate is dried, for example, by microwaves and hot air. Thereafter, through-holes (3) are alternately plugged at each end face so that each end face looks checkerboard pattern with a material similar to that for use in production of the honeycomb filter. After further drying, the plugged extrudate is heated to degrease, for example, in an $N_2$ atmosphere, and subsequently fired in inactive atmosphere such as Ar atmosphere to obtain the honeycomb segment according to the present invention. Thereafter, predetermined number of the obtained honeycomb segments are bonded by, for example, a ceramic cement, subsequently dried to harden at 200 degree C. By such a process, a honeycomb filter of the present invention can be obtained.

Catalyst may be loaded on the thus-produced honeycomb filter by a method ordinarily used by those skilled in the art, for example, by wash-coating a catalyst slurry on the honeycomb filter, and then drying and firing.

EXAMPLE

The present invention will be described hereinafter in more detail based on examples. However, the present invention is not limited to these examples.

Example 1

As a raw material, a mixed powder containing 75% by mass of SiC powder and 25% by mass of metal Si powder was used. To the powder, methyl cellulose, hydroxypropoxyl methyl cellulose, a surface-active agent, and water were added to prepare clay having plasticity. The clay was subjected to extrusion, and the extrudate was dried by microwave and hot air to obtain a honeycomb segment having a partition wall thickness of 380 ì m, a cell density of about 31.0 cells/cm$^2$ (200 cells/in.$^2$), a bulk density of 0.63 g/cm$^3$, a square section of 35 mm ×35 mm and a length of 152 mm. The through-holes are alternately plugged at each end face so that each end face looks checkerboard pattern with a material similar to that for use in production of the honeycomb filter, then the plugged segment was dried. The dried segment was degreased in N$_2$ atmosphere at about 400 degree C., and subsequently fired in an Ar inert atmosphere at about 1550 degree C. to obtain the honeycomb segment (A) of Si bonded SiC.

In the same manner as described above, honeycomb segment (B) of Si bonded SiC having a partition wall thickness of 330 ì m, a cell density of 31.0 cells/cm$^2$ (200 cells/in.$^2$), a bulk density of 0.55 g/cm$^3$, a square section of 35 mm ×35 mm and a length of 152 mm was obtained.

The four honeycomb segments (A) and the twelve honeycomb segments (B) were bonded using a mixture containing an alumino silicate material, silicon carbide powder, silica gel, and organic and inorganic binders, dried to harden at 200 degree C., and cut to obtain a cylindrical honeycomb filter having a diameter of 144 mm and a length of 152 mm. Characteristics of the obtained honeycomb filter are shown in Tables 2 and 3.

TABLE 2

| composition | SiC75%/Si25% |
|---|---|
| thermal expansion coefficient ($\times 10^{-6}$/° C.) | 4 (40-800° C.) |
| porosity(%) | 45 |
| average pore diameter (ì m) | 15 |
| thermal conductivity (W/Km) | 30 |

TABLE 3

| | A segment | | | B segment | | |
|---|---|---|---|---|---|---|
| No. | partition wall thickness (ì m) | cell density (cells/in.$^2$) | bulk density (g/cm$^3$) | partition wall thickness (ì m) | cell density (cells/in.$^2$) | bulk density (g/cm$^3$) |
| Comparative Example 1 | 380 | 200 | 0.63 | 380 | 200 | 0.63 |
| Comparative Example 2 | 300 | 300 | 0.61 | 300 | 300 | 0.61 |
| Comparative Example 3 | 430 | 150 | 0.61 | 430 | 150 | 0.61 |
| Example 1 | 380 | 200 | 0.63 | 330 | 200 | 0.55 |
| Example 2 | 380 | 300 | 0.75 | 280 | 200 | 0.48 |
| Example 3 | 380 | 200 | 0.63 | 380 | 150 | 0.55 |
| Example 4 | 300 | 300 | 0.61 | 270 | 300 | 0.55 |
| Example 5 | 300 | 300 | 0.61 | 240 | 300 | 0.50 |
| Example 6 | 300 | 300 | 0.61 | 300 | 200 | 0.51 |
| Example 7 | 300 | 300 | 0.61 | 300 | 150 | 0.44 |
| Example 8 | 430 | 150 | 0.61 | 380 | 150 | 0.55 |

Examples 2 to 8 and Comparative Examples 1 to 3

In the same manner as in Example 1, the honeycomb segments having the same size as in Example 1, a partition wall thickness, a cell density and a bulk density shown in Table 3 were produced, and the honeycomb filters having the same size as in Example 1 were obtained.

REGENERATION TEST 1

Each of the honeycomb filters obtained in Examples 1 to 8 and Comparative Examples 1 to 3 was installed in the exhaust line of a 3-liter direct injection diesel engine. The engine was run on diesel fuel containing 30 ppm of a Ce fuel additive produced by Rhodia to deposit 10 g/l of soot in the honeycomb filter. Subsequently, the honeycomb filter was heated to 600 degree C. with a propane burner, and the honeycomb filter inside was set to a 18% oxygen concentration by switching a by-pass valve to burn the soot and start regeneration of the honeycomb filter. Five minutes after the start of the regeneration, the temperature was lowered to 150 degree C., and a weight of remaining soot was measured to obtain a regeneration efficiency. The results are shown in Table 4. It can be seen that the regeneration efficiencies of the honeycomb filters of the present invention obtained in Examples 1 to 8 are remarkably higher than those in Comparative Examples 1 to 3.

TABLE 4

| No. | regeneration efficiency(wt %) |
|---|---|
| Comparative Example 1 | 73 |
| Comparative Example 2 | 79 |
| Comparative Example 3 | 67 |
| Example 1 | 81 |
| Example 2 | 88 |
| Example 3 | 80 |
| Example 4 | 91 |
| Example 5 | 95 |
| Example 6 | 90 |
| Example 7 | 91 |
| Example 8 | 78 |

Examples 9 to 11 and Comparative Examples 4 to 6

In the same manner as in Example 1, the honeycomb segments having the same size as in Example 1, and having a partition wall thickness, a cell density and a bulk density shown in Table 5 were produced using the materials shown in Table 5, and the honeycomb filters having the same size as in Example 1 were obtained in the same manner as in Example 1. Here, Si bonded SiC shown in Table 5 is the same material used in Examples 1 to 8.

Regeneration Test 2

For the honeycomb filter obtained in Examples 9 to 11 and Comparative Examples 4 to 6, regeneration test was carried out in the same manner as in Regeneration test 1. The results are shown in Table 5. From Table 5, the honeycomb filter of the present invention using, as a material for the filter, silicon nitride having a thermal conductivity of 20 W/mK or even recrystallized silicon carbide having a thermal conductivity of 60 W/mK showed better regeneration efficiency.

TABLE 5

| No. | segment material | thermal conductivity (W/mK, 40° C.) | A segment | | | B segment | | | regeneration efficiency(%) |
|---|---|---|---|---|---|---|---|---|---|
| | | | partition wall thickness (μm) | cell density (cells/in.$^2$) | bulk density (g/cm$^3$) | partition wall thickness (μm) | cell density (cells/in.$^2$) | bulk density (g/cm$^3$) | |
| Comparative Example 4 | recrystallized SiC | 60 | 380 | 200 | 0.67 | 380 | 200 | 0.67 | 53 |
| Example 9 | recrystallized SiC | 60 | 380 | 200 | 0.67 | 330 | 200 | 0.59 | 75 |
| Comparative Example 5 | Si bonded SiC | 30 | 380 | 200 | 0.63 | 380 | 200 | 0.63 | 73 |
| Example 10 | Si bonded SiC | 30 | 380 | 200 | 0.63 | 330 | 200 | 0.55 | 81 |
| Comparative Example 6 | silicon nitride | 20 | 380 | 200 | 0.66 | 380 | 200 | 0.66 | 74 |
| Example 11 | silicon nitride | 20 | 380 | 200 | 0.66 | 330 | 200 | 0.58 | 86 |

INDUSTRIAL APPLICABILITY

As described above, a honeycomb filter of the present invention shows better regeneration efficiency because an average bulk density of the honeycomb segment(s) disposed in the peripheral portion is lower than that of the honeycomb segment(s) disposed in the central portion. Therefore, a honeycomb filter of the present invention is expected to be used as a filter for an internal combustion engine, particularly a filter for capturing diesel particulate matter.

The invention claimed is:

1. A honeycomb filter comprising a plurality of honeycomb segments bonded into one piece, each of the honeycomb segments comprising partition walls having filtering function, and a number of through-holes divided from each other by the partition walls and extending in an axial direction,
    predetermined through-holes being plugged at one end face of the filter, and
    the remaining through-holes being plugged at the other end face of the filter,
    wherein the honeycomb segment disposed in a peripheral portion of the honeycomb filter has a lower average bulk density than that of the honeycomb segment disposed in a central portion, and
    wherein the honeycomb segment disposed in the peripheral portion of the honeycomb filter has a lower average partition wall thickness than that of the honeycomb segment disposed in a central portion.

2. The honeycomb filter according to claim 1, wherein the honeycomb segment disposed in the peripheral portion has a lower average cell density than that of the honeycomb segment disposed in the central portion.

3. The honeycomb filter according to claim 1, wherein the honeycomb filter has a thermal conductivity of 10 to 60 W/mK.

4. The honeycomb filter according to claim 2, wherein the honeycomb filter has a thermal conductivity of 10 to 60 W/mK.

5. The honeycomb filter according to claim 1, wherein the honeycomb filter comprises silicon carbide or silicon/silicon carbide based composite material.

6. The honeycomb filter according to claim 2, wherein the honeycomb filter comprises silicon carbide or silicon/silicon carbide based composite material.

7. The honeycomb filter according to claim 3, wherein the honeycomb filter comprises silicon carbide or silicon/silicon carbide based composite material.

8. The honeycomb filter according to claim 1, wherein 70% by volume or more of the honeycomb filter is constituted by the honeycomb segment having a sectional area of 900 to 10,000 mm$^2$ in a section perpendicular to the axial direction.

9. The honeycomb filter according to claim 2, wherein 70% by volume or more of the honeycomb filter is constituted by the honeycomb segment having a sectional area of 900 to 10,000 mm$^2$ in a section perpendicular to the axial direction.

10. The honeycomb filter according to claim 3, wherein 70% by volume or more of the honeycomb filter is constituted by the honeycomb segment having a sectional area of 900 to 10,000 mm$^2$ in a section perpendicular to the axial direction.

11. The honeycomb filter according to claim 5, wherein 70% by volume or more of the honeycomb filter is constituted by the honeycomb segment having a sectional area of 900 to 10,000 mm$^2$ in a section perpendicular to the axial direction.

* * * * *